UNITED STATES PATENT OFFICE.

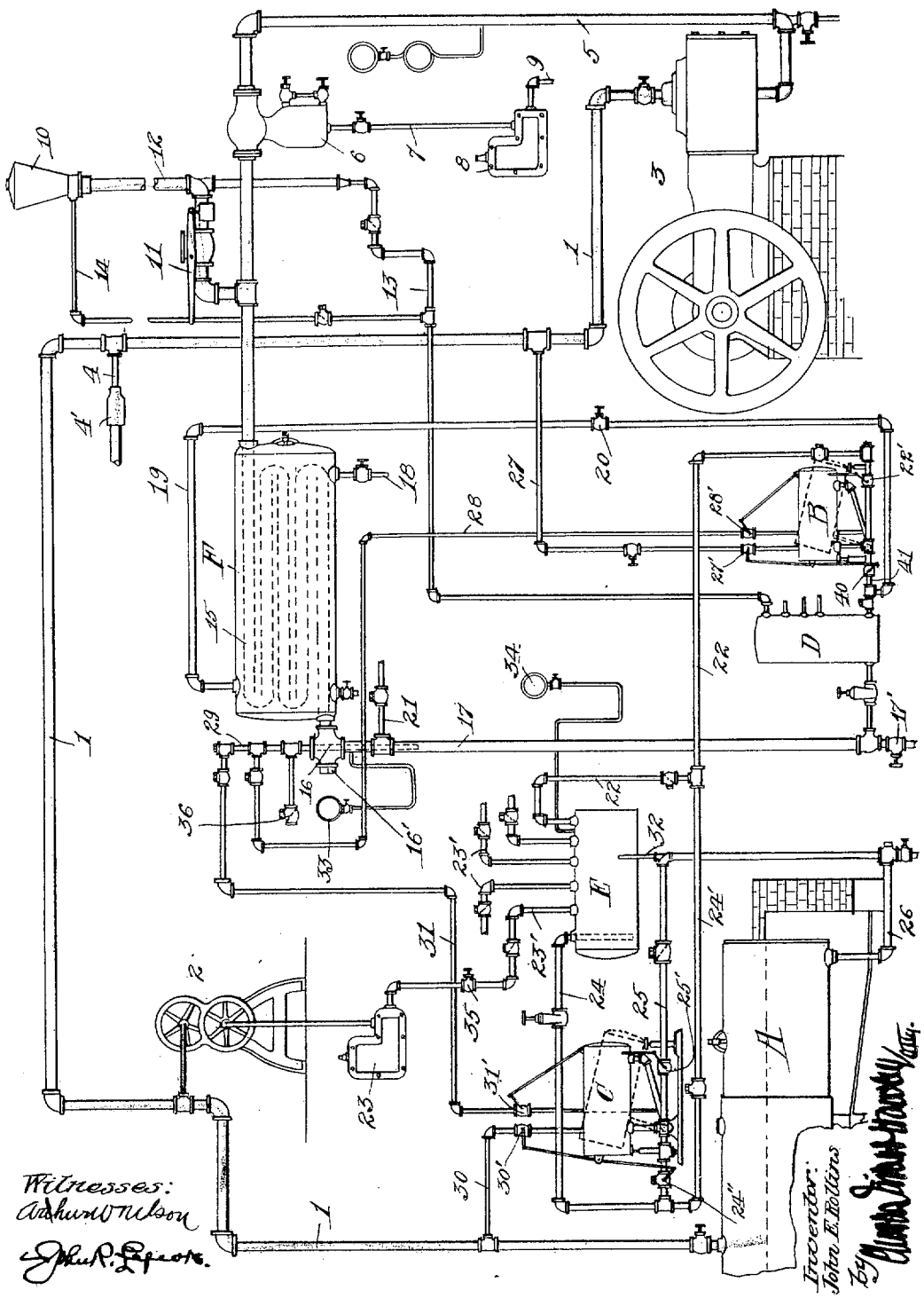

JOHN E. ROLLINS, OF CHICAGO, ILLINOIS.

SYSTEM OF CONSERVING HOT WATER.

977,841.  Specification of Letters Patent.  Patented Dec. 6, 1910.

Application filed September 6, 1910. Serial No. 580,593.

*To all whom it may concern:*

Be it known that I, JOHN E. ROLLINS, a citizen of the United States, and a resident of Chicago, Cook county, Illinois, have invented certain new and useful Improvements in Systems of Conserving Hot Water, of which the following is a full, true, clear, and exact description, such as will enable others skilled in the art to make and use the same.

My invention relates to improvements in hot water conserving systems and has particular reference to a system for collecting the water of condensation from various steam using devices having exhausts at different pressures and storing this collected condensation in heated condition in a pressure reservoir.

The object of my invention is to provide an automatic system by means of which the hot condensation from what might be termed atmospheric or low pressure steam using devices is added to the hot condensation or drip from high pressure steam using devices and the whole automatically discharged into a steam boiler or high pressure reservoir, without the necessity of using pumps.

My invention is comprised generally in a hot water collecting and conserving system, as fully described hereinafter, whereby water of condensation is collected at a comparatively low pressure and is automatically discharged into a comparatively high pressure reservoir by means of associated automatic traps and without the use of pumps, the arrangement of traps being such that while the high pressure trap receives the water collected in the low pressure trap the traps can discharge simultaneously and independently of each other.

A particular feature of my invention is the conserving of substantially all of the heat contained in the water of condensation collected from steam using devices such as laundry apparatus and steam engines, which are supplied by the boiler and which are adapted to deliver their water of condensation under various pressures, by uniting the various streams of exhaust water and delivering or discharging the whole into a common reservoir under pressure.

My invention will be more readily understood by reference to the accompanying drawing forming part of this specification and which is a diagrammatic representation of a boiler arranged to supply steam to various steam using devices and connected with a system of traps and receivers the whole embodying my invention.

In said drawings A is a steam boiler which supplies steam to various steam using devices.

B is an automatic trap located at a level below that of the lowest steam using apparatus so that the condensed water from said devices will readily flow thereinto.

C is an automatic trap arranged or located above the boiler or above the normal water level therein and adapted, when the pressure in the trap is equalized with that in the boiler, to permit the water contained in the trap to flow by gravity into the boiler.

D is a receiving tank which is adapted to collect the water of condensation from what might be termed the atmospheric or low pressure steam using devices (meaning by this expression the devices which deliver their water of condensation at substantially atmospheric pressure) and feed this water to the trap B.

E is a pressure tank or trap which is adapted to receive the discharge from the trap B and to deliver it into the trap C, thus permitting the discharge of the trap B independent of the action or condition of the trap C at the moment. The tank E also serves as a collecting tank for the water of condensation from the high pressure steam using apparatus, when such are connected with the system.

While my system conserves substantially all of the water of condensation from the various steam using apparati supplied by the boiler, still it is desirable to add some fresh water to the system to make up for any small loss or leakage. It is also highly important that this added feed water be as hot as possible. Furthermore, where a steam engine is supplied from the boiler it is necessary to condense the exhaust steam into the form of water in order to feed it back into the boiler. I combine with my system a condensing or heating tank F in which the fresh feed water is heated by the exhaust steam from the engine and at the same time the exhaust steam is condensed into the form of water and this water of condensation as well as the heated feed water is fed to the boiler through the system of traps and receivers.

The boiler A supplies steam to the high pressure steam using apparatus through the steam supply pipe 1, the high pressure devices being represented in the drawings by a mangle 2. Steam is also supplied to the steam engine 3 through the supply pipe 1 and to the other steam using devices (not shown) through the connection 4. As the apparatus supplied with steam through the connection 4 is designed to use steam at a comparatively low pressure a reducing valve 4' is provided by which the steam pressure is reduced to the desired point before passing to the low pressure devices.

The exhaust pipe 5 of the engine is connected with an oil separator 6, the drain pipe 7 of which is controlled by a low pressure trap 8, the oil or drain pipe 9 of which does not connect with the return system, the small amount of water escaping through this drain pipe constituting the only direct loss sustained by the system. The engine exhaust pipe 5 is also provided with an exhaust head 10, the connection to which is controlled by the back pressure valve 11. The riser 12 from the back pressure valve to the exhaust head is drained into the tank D through the pipe 13 which is controlled by suitably arranged check valves. The drain pipe 14 of the exhaust head is also connected into said pipe 13 whereby any drip or condensation collecting in the exhaust head is returned to the system.

It will be understood that the back pressure valve 11 only operates to permit the escape of the exhaust steam to the exhaust head 10 when the pressure in the exhaust pipe reaches a predetermined point, under usual or ordinary conditions, seldom or never operating to permit the escape of any exhaust steam. The exhaust from the engine is condensed in the system of radiating pipes or coils 15 mounted in the tank F and the water of condensation is drained therefrom through the connection 16 and pipe 17 and is collected in the receiving tank D. The tank F is a feed water heater as well as an exhaust steam condenser and is connected with a water supply pipe 18 by means of which fresh or new water may be supplied to the system. A hot water feed pipe 19 connects the upper portion of the feed water heater F with the low pressure trap B and is controlled by hand by means of a valve 20.

The drain pipe 17 is provided with a connection 21 which may be connected to the radiating devices supplied with steam through the steam connection 4, said radiating devices being such as are designed to use steam at a moderate or intermediate pressure between the high and low pressure steam using devices. The water of condensation from said devices is added to the water of condensation from the exhaust of the engine through the pipe 21 and is collected in the receiving tank D through the pipe 17.

The receiving tank E which may be termed a high pressure receiving tank is connected by the pipe 22 to the low pressure trap B through which the water collecting in the trap B may be discharged into the tank E. This tank is also provided with pipes or inlets which may be connected to various high pressure radiating devices, such for instance as the mangle 2. A high pressure trap 23 is interposed between the high pressure radiating devices 2 and the tank E in each of the pipes 23', which connect the high pressure receiving tank E with the various high pressure radiating devices. The high pressure receiving tank E is connected by a pipe 24 with the high pressure tilting trap C through which the water collecting in the tank E may be forced by the pressure therein into the trap C. The necessary pressure, for forcing the water from the tank E into the trap C, is maintained in said tank E by the escape thereinto of steam through the high pressure traps 23 as they discharge. The trap C is also connected by means of a pipe 24' with the pipe 22 leading from the trap B, whereby the condensation collecting in the trap B may be forced directly into the trap C. The trap C has its discharge 25 connected with the feed pipe 26 of the boiler so that the water contained in the trap C may be fed directly into the boiler A, by gravity, a check valve 25" preventing the escape of the boiler pressure into the trap C through the feed water connection.

Having thus briefly mentioned the various parts and connections, I will now describe the operation of the system.

As stated hereinbefore, one of the main objects of the invention is to conserve the hot water exhausted at different pressures from various steam using devices and store it under pressure and to this end it is necessary to collect or trap the drainage or water of condensation from the low or atmospheric pressure devices and also from the high pressure radiating devices. I arrange the receiving tank D at a low point so that the condensation from the various low pressure devices will readily be collected therein and I also arrange the low pressure automatic trap B at a low point, so that the water contained in the receiver D will readily flow by gravity into the trap and also that the feed water will flow into the trap from the heater F.

While many different styles of steam traps may be used, I prefer to use what is known as an automatic trap or one which automatically discharges itself when full. The trap B which is what is known as a tilting trap is adapted to automatically tilt itself in the manner of an overbalanced lever when the water reaches a predetermined level and in tilting it automatically closes the inlet and opens a discharge connection and also opens a connection whereby steam pressure is admitted into the trap above the water. The trap B is connected to the live steam pipe 1 by means of the pipe 27 and when the trap tilts to discharge it opens the valve 27' to admit steam into the trap which causes the water therein to be discharged through the pipes 22 and 24 into the high pressure trap C, the trap B opening the discharge valve 22' in the pipe 22 to permit this discharge. The trap B is also connected with the drain pipe 17 through the pipes 28 and 29 through which the steam remaining in the trap at the moment of complete discharge may be exhausted and when the trap tilts to discharge it also closes the exhaust valve 28' in the pipe 28 and the water inlet valve 40 in the water supply pipe 41. Should the trap C be operating to discharge its contents at the time the trap B discharges, the discharge from the trap B is forced into the high pressure receiving tank E through the pipe 22. In case there are no high pressure devices discharging into the tank E the fact that it is a closed tank causes a pressure to be maintained therein by the discharge of the water from the trap B. When the trap B returns to its normal position it automatically opens the exhaust valve 28' and the water inlet valve 40 and closes the steam inlet valve 27' and the water discharge valve 22'.

The pipe 29 which carries the exhaust of the trap B into the drain pipe 17 through the connection 16, extends downwardly through said connection 16 into the upper end of said drain pipe 17, past the connection of the pipe 21 with said drain pipe. This construction causes the force or puff of the discharge of steam from the trap B to project itself downwardly into the comparatively large drain pipe 17 and be condensed thereby and thus prevents it from being forced into the condenser 15 or into the connecting pipe 21. The high pressure trap C is likewise connected to the steam supply by means of the pipe 30 which is controlled by the valve 30' and to the drain pipe 29 by means of the pipe 31 controlled by the valve 31' similar to the connections 27 and 28 of the trap B. When the trap C operates to discharge its contained water it opens the steam supply valve 30' and also the discharge valve 25', which controls the discharge pipe 25, and at the same time closes the water inlet valve 24'' in the water supply pipe 24' as well as the valve 31' in the steam exhaust pipe 31. This operation of the various valves by the trap C admits steam from the supply pipe 1 which equalizes the pressure above the water in the trap with the boiler pressure and the discharge from the trap is caused to flow through the pipes 25 and 26 into the boiler by gravity. A check valve 26' prevents the escape of pressure from the boiler into the trap C at any time.

The pipe 25 is provided with a thermometer 32 by which the temperature of the feed water entering the boiler may be readily ascertained. The drain pipe 17 is provided with a pressure gage 33 by means of which the proper operation of the trap B is indicated, because should the trap B fail to properly operate and drain the water from the receiving tank D and drain pipe 17, the water would back up in the drain pipe 17 to the gage 33 and the exhaust from the engine would then cause the hand on the gage 33 to oscillate violently. The pipe 17 is also provided with a drain valve 17' on its lower end and when starting up a plant it is desirable to leave this valve open until the air is exhausted from the condenser and the various pipes.

The high pressure receiving tank E is provided with a pressure gage 34 suitably connected therewith by means of which the various high pressure traps may be tested, that is, should the pressure gage 34 show a pressure, approximating the boiler pressure, it would indicate that one or more of the high pressure traps connected with the receiving tank E were allowing live steam to pass through them into said receiving tank E. Each of the pipes 23' is provided with a valve 35 by means of which the tank E may be cut off from each of the high pressure radiating devices and its trap. By closing certain of these valves 35 and observing the pressure indicated by the pressure gage 34, the operation of the various high pressure traps may be easily tested.

A check valve 36 is connected with the pipe 29 and is adapted to admit air into said pipe 29 and consequently into the condensing radiator 15, should the pressure within the radiator drop below the atmosphere and thereby form a vacuum which might prevent water in said low pressure receiving tank D from flowing freely into the low pressure trap B. The above condition might arise at times on account of the large condensing area which I provide in the condensing radiator 15 to insure the complete condensation of all of the steam exhausted from the engine.

The connection 16, which is preferably in the form of a pipe cross, has the opening which is opposite to the connection of said cross with the condensing coil 15 closed by means of a removable plug 16'. By removing this plug 16' the flow of water from the condenser coil 15 into the pipe 17 may be observed and samples of the water may be procured to determine the operation of the oil separator or for other reasons. The fact that this system is practically under no pressure at this point, or, in other words, is under atmospheric pressure, permits the removal of the plug 16' without permitting the escape of steam or causing any harmful results.

All of the various pipes and connections between the different devices in the system are supplied with proper shut-off valves and check valves, the check valves being arranged to permit the flow of water or steam in the direction desired and preventing the flow in the opposite direction.

It will readily be seen that my improved system of collecting and conserving hot water, exhausted under different pressures, may be varied to suit many different conditions. While I have illustrated the system as applied to a plant in which one boiler supplies steam to various steam using devices, and the system collects the hot water exhausted and feeds it back into the boiler, it will be understood that this arrangement is merely typical of the many possible applications of the invention as the source of the supply of steam used in the various devices need not necessarily be one steam boiler or, indeed, need not be the same reservoir in which the collected hot water is stored. The collected hot water may be stored, under pressure, for use simply as hot water in various manufacturing processes, instead of being used as boiler feed-water.

Having thus described my invention I claim as new and desire to secure by Letters Patent:

1. A hot water conserving system comprising a hot water reservoir maintained under comparatively high pressure, steam using apparatus furnishing hot water of condensation at low pressure, other steam using apparatus furnishing hot water of condensation at a higher pressure, a closed receiver for said low pressure condensation, a closed collecting tank for said higher pressure condensation, and a closed trap receiving the hot water from said tank and adapted to deliver its contents to said hot water reservoir, communication between said low pressure receiver and said pressure tank and a by-pass around said tank connecting the low pressure receiver and said trap, and communication between said pressure tank and said trap, means for increasing the pressure at intervals in said low pressure receiver to force its contents into said trap or into said pressure tank, and means for increasing the pressure at intervals in said trap to cause its contents to flow into said high pressure reservoir.

2. A hot water conserving system comprising a steam boiler maintained at comparatively high pressure, a steam using apparatus furnishing hot water of condensation at low pressure, other steam using apparatus supplying hot water of condensation at a higher pressure, a closed receiver for said low pressure condensation, a closed collecting tank for said higher pressure condensation, a gravity, pressure trap arranged above the normal water line in said boiler and adapted to feed its contents into said boiler by gravity, communication between said low pressure trap and said pressure tank and a by-pass around said tank connecting said low pressure receiver with said trap, and communication between said pressure tank and said trap, means for increasing the pressure at intervals in said low pressure receiver to force its hot contents either into said pressure tank or into said trap, and means for increasing the pressure in said trap, at intervals, to permit its contents to flow into said boiler by gravity.

3. A system for returning hot water of condensation to boilers comprising a boiler supplying steam at comparatively high pressure, steam using apparatus receiving steam therefrom and furnishing water of condensation at low pressure, other steam using apparatus receiving steam therefrom and furnishing water of condensation at a higher pressure, a closed receiver for said low pressure condensation, a closed pressure collecting tank for said higher pressure condensation, a closed, pressure, gravity trap arranged above the normal water level in said boiler and adapted to deliver its contents into said boiler by gravity, communication between said low pressure receiver and said trap, communication between said low pressure receiver and said tank, communication between said pressure tank and said pressure trap, permitting the discharge of said tank into said trap, means for increasing the pressure at intervals in said low pressure receiver to force its contents either into said trap or into said pressure tank, and means for increasing the pressure at intervals in said trap for equalizing the pressure in said trap with the boiler pressure to cause the discharge of the contents of the trap into the boiler.

4. A system for returning water of condensation to boilers comprising, a boiler supplying steam at a comparatively high pressure, steam using apparatus receiving steam therefrom and supplying hot water of condensation at low pressure, other steam using apparatus receiving steam therefrom and supplying hot water of condensation at a higher pressure, a low pressure steam trap receiving said low pressure condensation and a high pressure steam trap located above the normal level in said boiler and receiving said higher pressure condensation, means for increasing the pressure in said low pressure trap at intervals, to cause the discharge of its contents into said high pressure trap, means for equalizing the pressure in said high pressure trap, at intervals with the boiler pressure to cause the flow of its contents into said boiler, and a pressure tank connected with both of said traps, receiving the discharge from said low pressure trap when the high pressure trap is discharging and thereby permitting the discharge of the low pressure trap independently of said high pressure trap, said pressure tank being adapted to discharge its contents into said high pressure trap.

5. A hot water conserving system comprising a hot water reservoir maintained under comparatively high pressure, steam using apparatus furnishing hot water of condensation at low pressure, other steam using apparatus furnishing hot water of condensation at a higher pressure, a closed receiver for said low pressure condensation, and a closed pressure trap adapted to receive said higher pressure condensation water, means for increasing the pressure at intervals in said receiver to force its hot contents into said trap and means for increasing the pressure at intervals in said trap to force its contents into said high pressure reservoir.

6. A hot water conserving system comprising a steam boiler maintained at comparatively high pressure, a steam using apparatus furnishing hot water of condensation at low pressure, other steam using apparatus supplying hot water of condensation at a higher pressure, a closed receiver for said low pressure condensation, a closed gravity discharge trap located above the normal water line in said boiler and adapted to receive said higher pressure condensation, under pressure, means for increasing the pressure in said receiver at intervals to force its hot contents into said trap, and means for equalizing the pressure in said trap with the boiler pressure, at intervals, to cause the flow of its contents into said boiler.

7. A system for returning water of condensation to boilers comprising a boiler supplying steam at comparatively high pressure, steam using apparatus receiving steam therefrom and furnishing water of condensation at a low pressure, other steam using apparatus receiving steam therefrom and furnishing water of condensation at a higher pressure, a closed receiver for said low pressure condensation, a closed gravity trap adapted to receive said higher pressure water of condensation, means for increasing the pressure in said receiver, at intervals, to force its contents into said trap, and means for equalizing the pressure in said trap with the boiler pressure, at intervals, to cause the discharge of the contents of the trap into the boiler.

8. A hot water conserving system comprising a hot water reservoir maintained under comparatively high pressure, steam using apparatus furnishing hot water of condensation at low pressure, other steam using apparatus furnishing hot water of condensation at a higher pressure, a closed receiver for said low pressure condensation, a closed collecting tank for said higher pressure condensation, means for increasing the pressure at intervals in said receiver to force its hot contents into said collecting tank, a closed trap receiving the hot water from said tank, and means for increasing the pressure at intervals in said trap to cause its contents to flow into said high pressure reservoir.

9. A reservoir conserving system comprising a steam boiler maintained at comparatively high pressure, steam using apparatus furnishing hot water of condensation at low pressure, other steam using apparatus supplying hot water of condensation at a higher pressure, a closed receiver for said low pressure condensation, a closed collecting tank for said higher pressure condensation, means for increasing the pressure in said receiver at intervals to force its hot contents into said tank, a closed trap arranged above said boiler and adapted to discharge its contents into said boiler by gravity and to receive the hot water from said tank, and means for equalizing the pressure in said trap with the pressure in the boiler at intervals, to cause the flow of its contents into said boiler.

10. A system for returning water of condensation to boilers, comprising a boiler supplying steam at comparatively high pressure, apparatus receiving steam therefrom and furnishing water of condensation at low pressure, other apparatus receiving steam therefrom and furnishing water of condensation at a higher pressure, a closed receiver for said low pressure condensation, a closed pressure collecting tank for said higher pressure condensation, means for increasing the pressure in said receiver at intervals to force its hot contents into said pressure tank, a closed trap positioned above said boiler and adapted to discharge its contents into said boiler by gravity and also adapted to receive the contents of said tank, and means for equalizing the pressure in said trap with the boiler pressure, at intervals, to cause the discharge of the contents of the trap into the boiler.

11. A hot water conserving system comprising a hot water reservoir maintained under comparatively high pressure, steam using apparatus furnishing hot water of condensation at a comparatively low pressure, a closed receiver for said condensation, a closed pressure tank receiving the water from said receiver, means for increasing the pressure in said receiver at intervals to force its contents into said tank, a closed trap receiving the contents of said pressure tank, and means for increasing the pressure at intervals in said trap to cause it to discharge its contents into said hot water reservoir.

12. A system for returning water of condensation to boilers comprising a steam boiler furnishing steam under comparatively high pressure, steam using apparatus furnishing water of condensation at a comparatively low pressure, a closed receiver for said condensation, a closed pressure tank receiving the water from said receiver, means for increasing the pressure in said receiver at intervals to force its contents into said tank, a closed trap positioned above the water line in said boiler and adapted to discharge its contents into the boiler by gravity, and adapted to receive the contents of said tank, and means for equalizing the pressure in said trap at intervals with the pressure in said boiler to permit the contents of the trap to flow into the boiler.

13. A hot water conserving system comprising a steam using apparatus furnishing water of condensation at a comparatively high pressure, and a hot water reservoir maintained under a higher pressure, a closed pressure tank receiving said condensation, a closed trap receiving the water from said tank, and means for increasing the pressure in said trap at intervals to cause it to discharge its contents into said reservoir.

14. A system for returning water of condensation to boilers comprising a steam boiler maintained at comparatively high pressure, steam using apparatus connected with said boiler and furnishing water of condensation at a pressure below said boiler pressure and above atmospheric pressure, a closed pressure tank receiving said condensation and maintained thereby under pressure, a closed trap located above the normal water line in said boiler and adapted to discharge its contents into the boiler by gravity and to receive the water from said tank, and means for equalizing the pressure in said trap, at intervals with the boiler pressure to permit the water in said trap to flow into the boiler.

In testimony whereof I have hereunto set my hand this 29th day of August, 1910, in the presence of two subscribing witnesses.

JOHN E. ROLLINS.

Witnesses:
  EDWARD F. WILSON,
  JOHN R. LEFEVRE.